US011994042B1

(12) United States Patent
Williams

(10) Patent No.: US 11,994,042 B1
(45) Date of Patent: May 28, 2024

(54) ADJUSTABLE REVERSE ROTATION CAMSHAFT DRIVE MECHANISM

(71) Applicant: Neutron Engines LLC, Phoenix, AZ (US)

(72) Inventor: Craig Williams, Phoenix, AZ (US)

(73) Assignee: Neutron Engines LLC, Phoenix, AZ (US)

( * ) Notice: Subject to any disclaimer, the term of this patent is extended or adjusted under 35 U.S.C. 154(b) by 0 days.

(21) Appl. No.: 18/236,834

(22) Filed: Aug. 22, 2023

(51) Int. Cl.
*F01L 1/053* (2006.01)
*F01L 1/02* (2006.01)
*F01L 1/46* (2006.01)
*F02B 75/22* (2006.01)

(52) U.S. Cl.
CPC ............... *F01L 1/053* (2013.01); *F01L 1/022* (2013.01); *F01L 1/026* (2013.01); *F01L 1/46* (2013.01); *F01L 2001/0537* (2013.01); *F01L 2250/02* (2013.01); *F01L 2250/06* (2013.01); *F02B 75/22* (2013.01)

(58) Field of Classification Search
CPC . F01L 1/022; F01L 1/026; F01L 1/053; F01L 2001/0537; F01L 1/46; F01L 2250/02; F01L 2250/06; F02B 75/22
USPC ........................................... 123/90.27, 90.31
See application file for complete search history.

(56) References Cited

U.S. PATENT DOCUMENTS

2006/0243236 A1* 11/2006 Okamoto ................ F01L 1/024
123/90.31

FOREIGN PATENT DOCUMENTS

DE 102011082564 A1 * 3/2013 .............. F01L 1/022
EP 0599125 A1 * 6/1994 .............. F02B 75/22

* cited by examiner

*Primary Examiner* — Jorge L Leon, Jr.
(74) *Attorney, Agent, or Firm* — Schwegman Lundberg & Woessner, P.A.

(57) ABSTRACT

A piston engine described allows identical cylinder heads rather than requiring mirror image left and right heads. The engine has front and rear sides, with engine block containing two opposing cylinder banks. Identical heads mounted on block, with overhead camshaft structures in each head. Crankshaft between banks has front and rear gears. At rear is reverse-rotation gear mechanism with internal and external gears. External gear engages crankshaft's rear gear. First chain connects reverse-rotation internal gear to first camshaft sprocket on one head at rear. Second chain connects crankshaft's front gear to second camshaft sprocket on other head at front. Allows driving overhead camshafts of identical heads rather than requiring left and right mirror image heads.

10 Claims, 8 Drawing Sheets

ADJUSTABLE REVERSE ROTATION CAMSHAFT DRIVE MECHANISM

TECHNICAL FIELD

Embodiments of the present disclosure relate generally to the field of internal combustion engines, and more particularly, to mechanisms for driving overhead camshafts in internal combustion engines.

BACKGROUND

A reciprocating engine, also often known as a piston engine, is typically a heat engine that uses one or more reciprocating pistons to convert high temperature and high pressure into a rotating motion. There may be one or more pistons. Each piston is inside a cylinder, into which a gas is introduced, and heated inside the cylinder either by ignition of a fuel air mixture. Piston engines may be configured in a number of arrangements, including inline engines, flat engine, boxer engines, piston engines, or "V" engines, wherein the engine comprises a bank angle that indicates an angle between the centerlines of two banks of cylinders in a V-configuration. Some piston engines may comprise more than two cylinder heads, such as radial engines.

The straight or inline engine is an internal combustion engine with all cylinders aligned in one row and having no offset. Inline engines are considerably easier to build than an otherwise equivalent "V" piston engine, because they require fewer cylinder heads and camshafts.

A V engine, on the other hand, consists of two cylinder banks—usually with the same number of cylinders in each bank—connected to a common crankshaft. These types of engines typically have a shorter length than equivalent inline engines, however the trade-off is a larger width. V6, V8 and V12 engines are the most common layout for automobile engines with 6, 8 or 12 cylinders respectively.

In most piston engines, the camshaft(s) are mechanically connected to the crankshaft via a timing belt, timing chain, timing gear, or pushrods, which in turn actuates the intake and exhaust valves. In piston engines that utilize overhead camshafts, the camshaft is located in the cylinder head above the combustion chamber. Typically, V engines utilize two cylinder heads, wherein each cylinder head is a mirror image of the other. As a result, manufacturing costs related to production of V piston engine are typically greater than that of a similar inline engine, due to the need for distinct "left" and "right" heads and related components.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
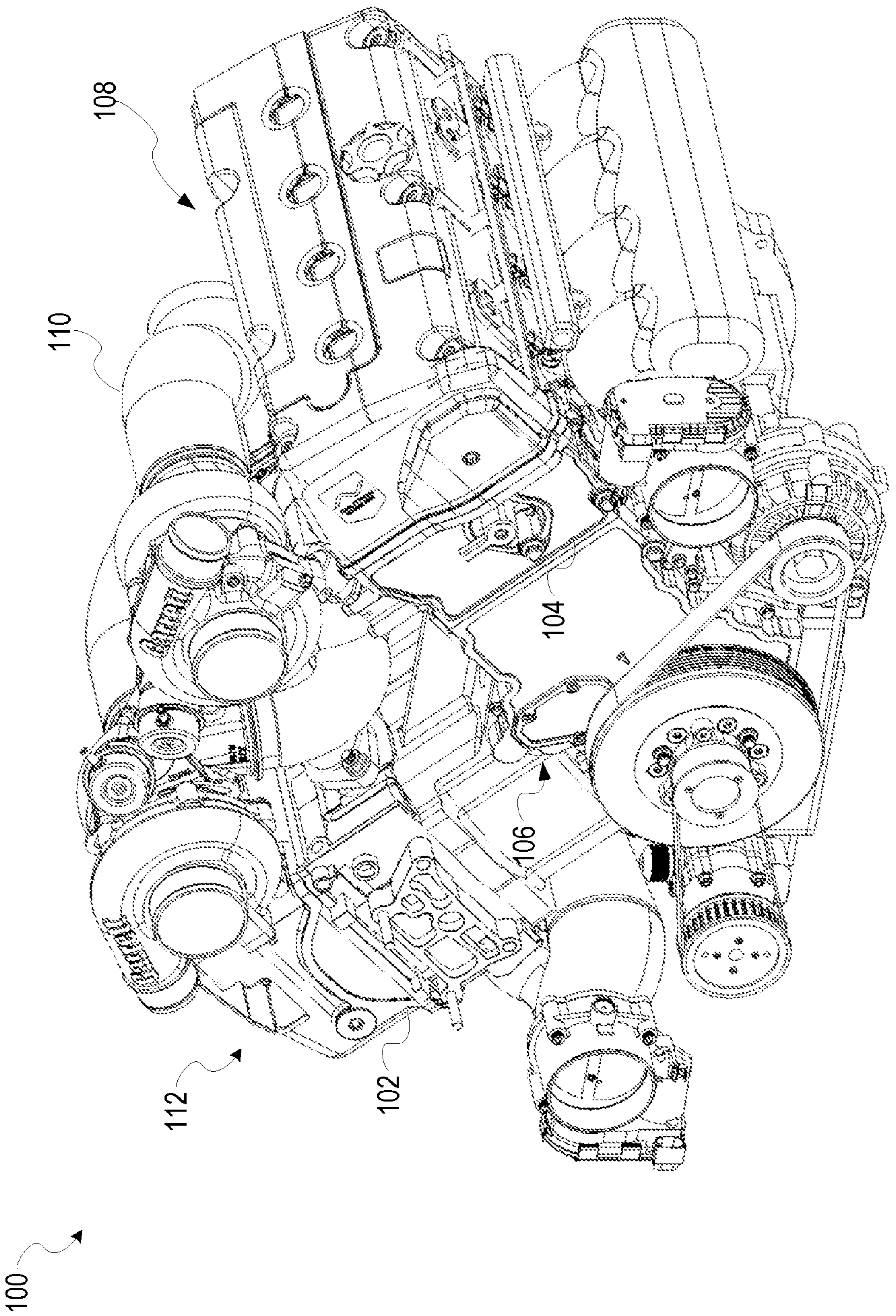
FIG. 1 is a front perspective view of a piston engine that comprises an adjustable reverse rotation camshaft drive mechanism, according to certain example embodiments.

As discussed above, in most piston engines, camshafts are mechanically connected to an internal crankshaft via a timing belt, timing chain, timing gear, or pushrods, which in turn actuates the intake and exhaust valves within the cylinder head. Camshafts are typically driven off the "front" of the engine, because of space constraints existing at the "rear" of the engine.

Because overhead camshafts are typically driven off the front of the engine, a piston engine may utilize two distinct cylinder heads, wherein each cylinder head is a mirror image of the other in order to account for a timing belt and gear to drive the overhead camshafts. As a result of the need for distinct mirror image cylinder heads, design and manufacturing costs related to production of a piston engine having two or more cylinder heads are typically greater than that of a similar inline engine, due to the need for distinct "left" and "right" cylinder heads and related components. Accordingly, a piston engine designed to utilize existing off-the-shelf inline cylinder heads would provide benefits related to a reduction in cost for manufacturing replacement parts, and increased availability of those replacement parts.

Example embodiments described herein relate to a piston engine, wherein the piston engine comprises: an engine block that includes a first bank of cylinders and a second bank of cylinders, the first bank of cylinders and the second bank of cylinders positioned opposing one another; a pair of cylinder heads that comprise a first cylinder head and a second cylinder head, mounted upon the engine block, the first cylinder head corresponding with the first bank of cylinders, and the second cylinder head corresponding with the second bank of cylinders; a first overhead camshaft structure located within the first cylinder head, comprising at least a first camshaft that comprises a first camshaft sprocket located at the rear side of the piston engine; a second overhead camshaft structure located within the second cylinder head, comprising at least a second camshaft that comprises a second camshaft sprocket located at the front side of the piston engine; a crankshaft located between the first bank of cylinders and the second bank of cylinders, the crankshaft comprising a front end, and a rear end, the front end of the crankshaft comprising a front gear and the rear of the crankshaft comprising a rear gear; a reverse-rotation gear mechanism comprising an internal gear and an external gear, the external gear engaged with the rear gear of the crankshaft; a first chain engaged with the internal gear of the reverse-rotation gear mechanism and the first camshaft sprocket of the first camshaft; and a second chain engaged with the front gear of the crankshaft and the second camshaft sprocket to drive the second overhead camshaft structure located within the second cylinder head.

According to certain example embodiments, the reverse-rotation gear mechanism may comprise a two-piece gear mechanism, wherein the internal gear and external gear are mated to one another, for example by a series of bolts. For example, an internal gear structure may be machine or otherwise formed to comprise a flattened external mating surface that comprises a series of slotted holes arranged along the flattened external mating surface, and which may include an alignment hole (i.e., zeroing pin) with which to align the internal gear with the external gear.

In some embodiments, the reverse-rotation gear mechanism may comprise one or more of spur gears or helical gears based on application. For example, while helical gears are generally quieter in operation than spur gears, helical gears generate axial thrust and require thrust bearings to cope with more load. Accordingly, in some embodiments, the reverse-rotation gear mechanism may further comprise thrust bearings. Friction and wear are considerations in choosing spur gears over the helical type.

The external gear structure may therefore likewise be formed to include a mating surface upon which to mount the internal gear structure, wherein the mating surface comprises a series of circular mounting holes which may be aligned to the series of slotted holes by the alignment hole, and wherein a position of the external gear structure relative to the internal gear structure may be adjusted by rotating/clocking the external gear structure as provided by the series of slotted holes arranged along the flattened external surface of the internal gear structure.

In some embodiments, when the external gear structure is mated upon the internal gear structure by the flattened external mating surface, the internal gear may protrude through a central pass-through of the external gear structure.

In some embodiments, the external gear structure may be configured to comprise a 1:1 ratio with the rear gear of the crankshaft, while the internal gear structure may comprise a 2:1 ratio with the rear gear of the crankshaft.

In some embodiments, the reverse-rotation gear mechanism may further comprise a rear bearing support, wherein the rear bearing support includes a chain guard. For example, the rear bearing support may comprise a protrusion that extends through a center hole of the internal gear structure, and wherein a bearing may be internally supported by the protrusion.

In some embodiments, the rear of the piston engine may comprise a two-piece backplate, wherein the two-piece backplate comprises a first portion and a second portion, and wherein the second portion may be removed to expose the reverse-rotation gear mechanism.

Figure 3:
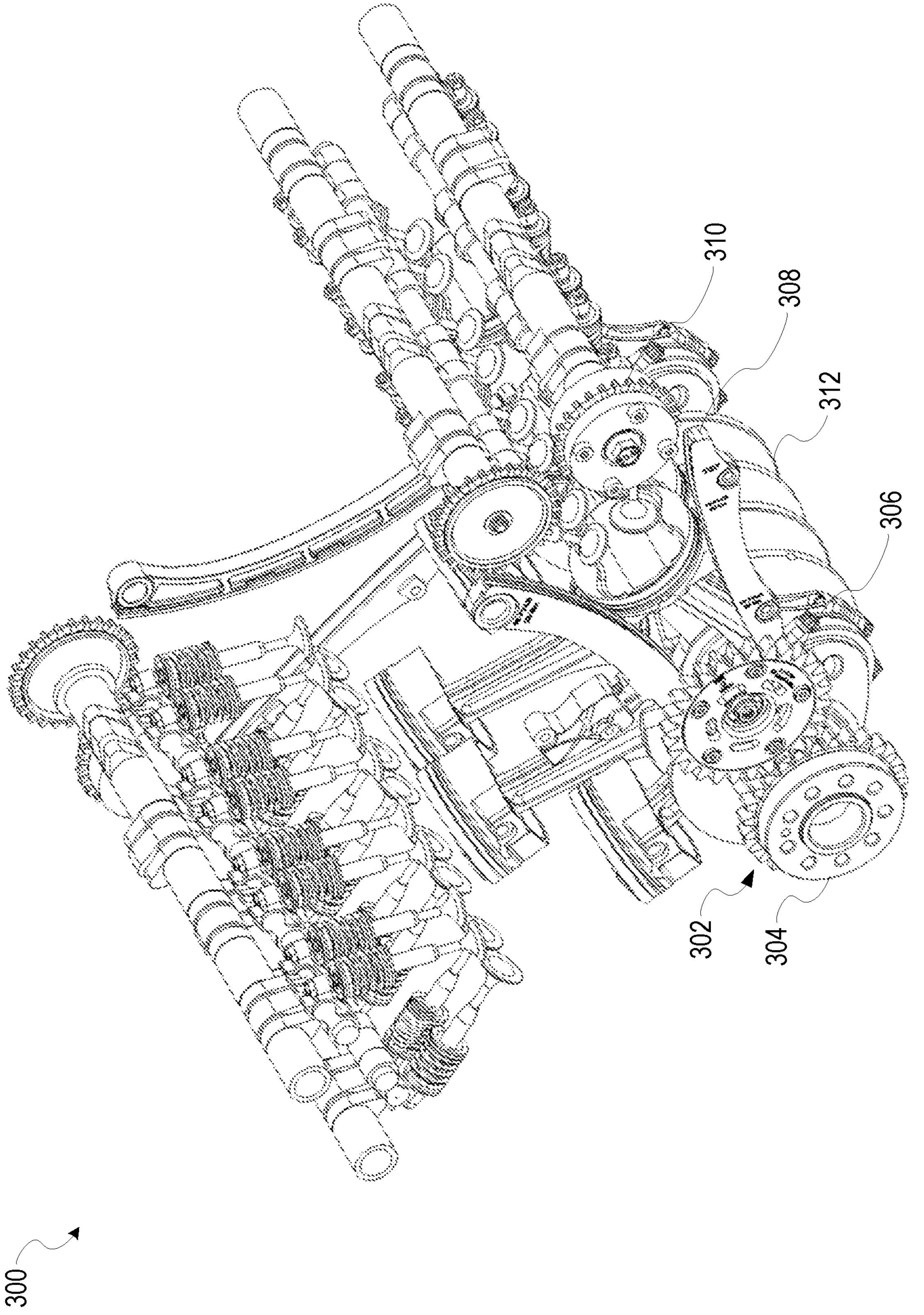
FIG. 3 is an exposed rear perspective view of a piston engine that comprises an adjustable reverse rotation camshaft drive mechanism, according to certain example embodiments.

FIG. 1 is a front perspective view 100 of a piston engine 112 that comprises an adjustable reverse rotation camshaft drive mechanism (as depicted in FIG. 3) located at the rear 108 of the piston engine 112, according to certain example embodiments. The front perspective view 100 provides an illustration of a preferred embodiment, wherein a first cylinder head 102 and an identical second cylinder head 104 are mounted upon a block 106. According to certain example embodiments, the block 106 is configured to "reverse" mount the second cylinder head 104, so that the camshaft drive end of the second cylinder head 104 is located at the rear 108 of the piston engine 112.

In some embodiments, the piston engine 112 may be configured such that exhaust ports of the first cylinder head 102 and the second cylinder head 104 face one another in the "V" of the piston engine 112, and wherein an exhaust manifold 110 (e.g., an exhaust manifold or turbo manifold) may be located within the "V" of the piston engine 112.

Figure 2:
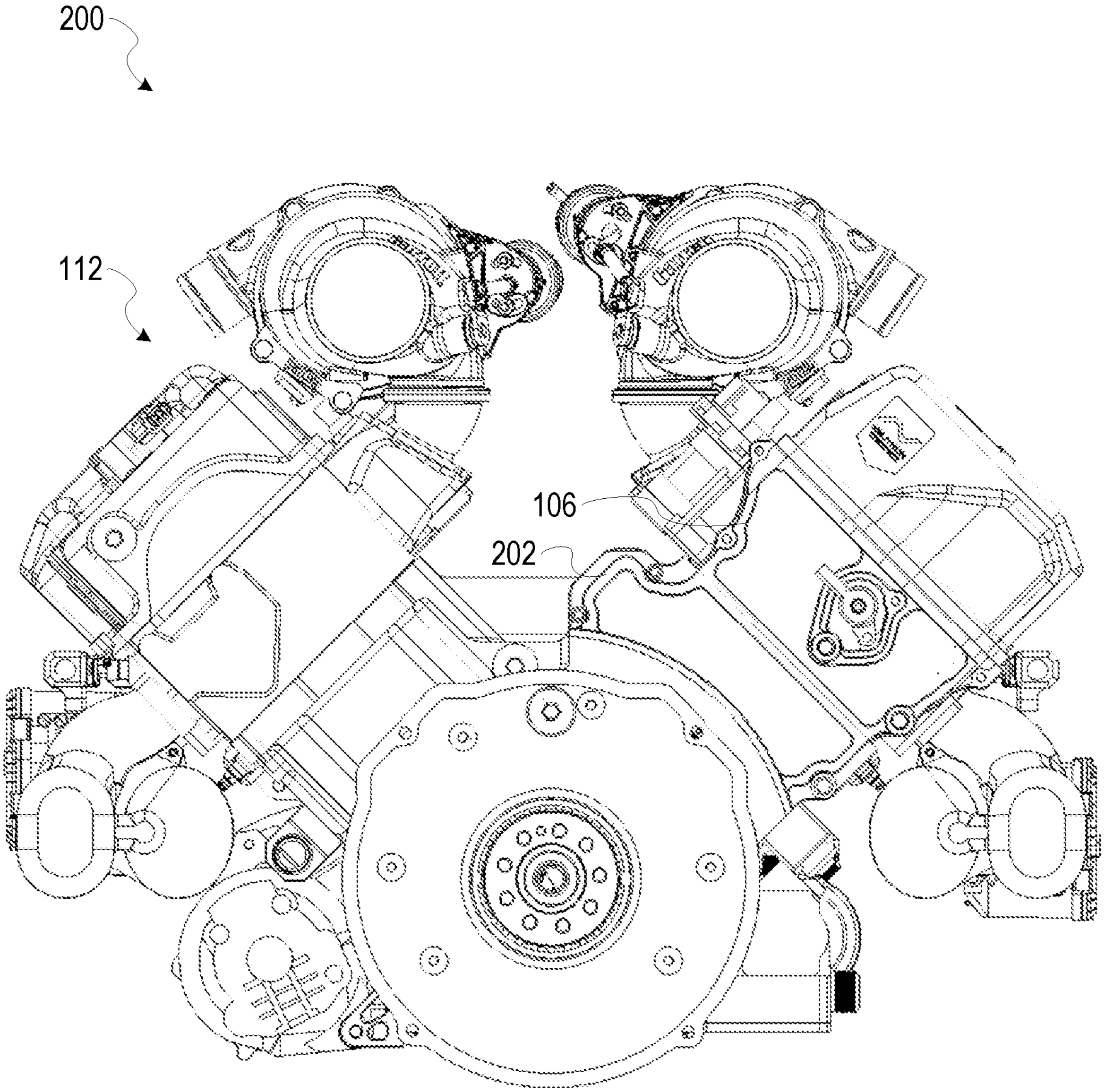
FIG. 2 is a rear view of a piston engine that comprises an adjustable reverse rotation camshaft drive mechanism, according to certain example embodiments.

FIG. 2 is a rear view 200 of a piston engine (i.e., the piston engine 112) that comprises an adjustable reverse rotation camshaft drive mechanism (as depicted in FIG. 3), according to certain example embodiments.

As seen in the rear view 200 of the piston engine 112, an adjustable reverse rotation camshaft drive mechanism may be located at a rear side of the piston engine 112, and in some embodiments may be covered by a rear timing-chain cover 202. The rear timing-chain cover 202 may comprise two parts, wherein a portion 106 of the rear timing chain cover 202 may be removable to provide access to the adjustable reverse rotation camshaft drive mechanism.

FIG. 3 is an exposed rear perspective view 300 of internal components of a piston engine 112, that comprises an adjustable reverse rotation camshaft drive mechanism 302, according to certain example embodiments.

As seen in the exposed rear perspective view 300, the adjustable reverse rotation camshaft drive mechanism 302 may comprise a crank-gear 304 which is driven off the crankshaft 312, an adjustable reverse-rotation cam gear 306, and one or more chain guides 308 which retain a drive mechanism to drive the cam gear 310. In some embodiments, the drive mechanism may include a chain, a belt, a set of planetary gear, or any combination thereof.

In some embodiments, the cam gear 310 may further comprise an adjustable cam phaser unit that includes an oil control valve configured to enable continuous adjustment of camshaft timing by rotating the camshaft sprocket relative to the camshaft.

Figure 4:
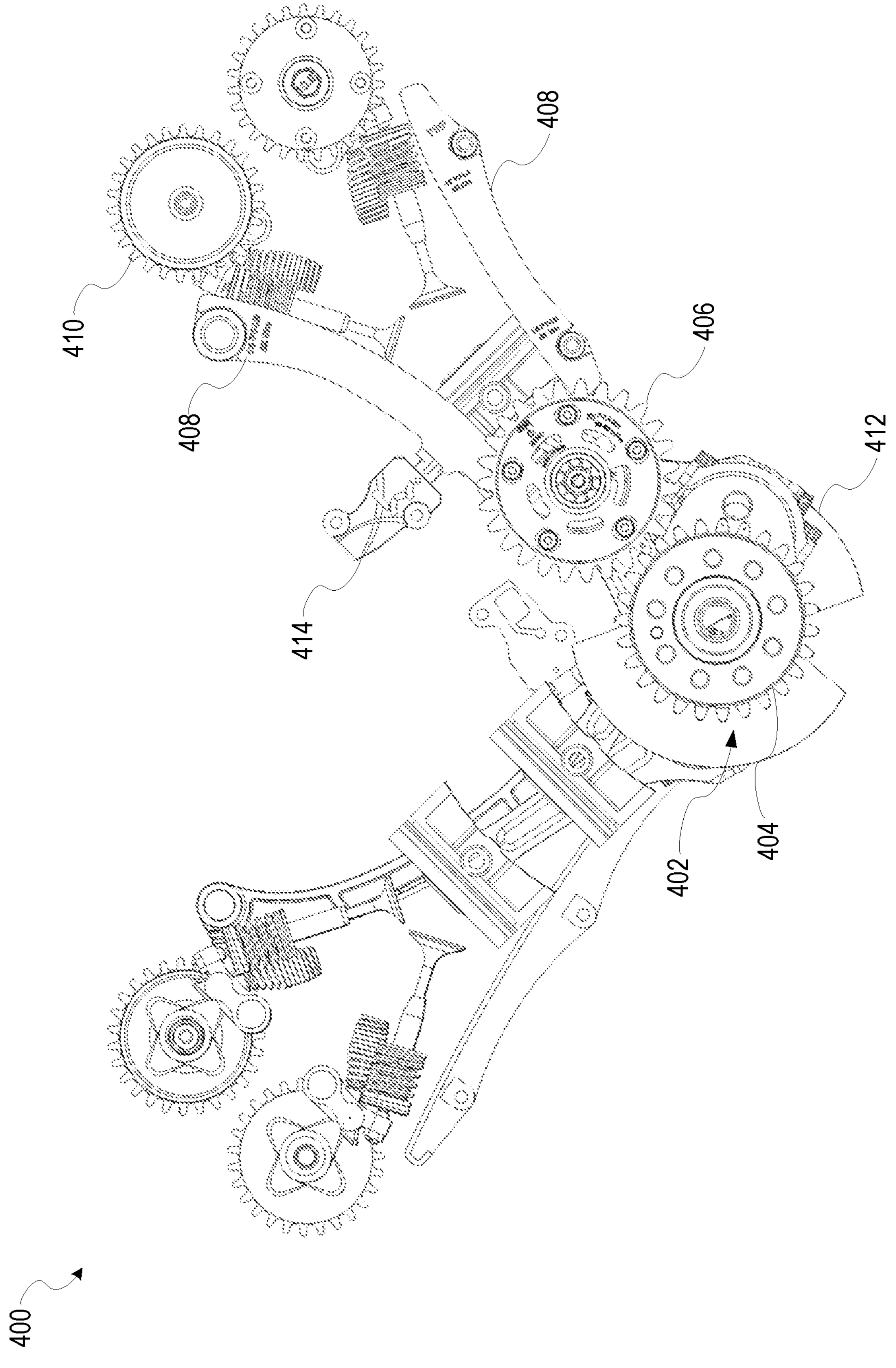
FIG. 4 is an exposed rear view of a piston engine that comprises an adjustable reverse rotation camshaft drive mechanism, according to certain example embodiments.

FIG. 4 is an exposed rear view of a piston engine that comprises an adjustable reverse rotation camshaft drive mechanism, according to certain example embodiments.

As seen in the exposed rear perspective view 400, the adjustable reverse rotation camshaft drive mechanism 402 may comprise a crank-gear 404 which is driven off the crankshaft 412, an adjustable reverse-rotation cam gear 406, one or more chain guides 408 which retains a drive mechanism to drive the cam gear 410, and a tensioner 414. The chain guides 408 position and direct the drive chain from the adjustable cam gear 406 to the cam gear 410. In some embodiments, a chain guide 408 may include a provision into which the tensioner 414 may be inserted to apply tension to a chain driven by the adjustable reverse-rotation cam gear 406.

In some embodiments, the tensioner 414 may utilize a hydraulic piston design activated by engine oil pressure to take up chain slack, or in some embodiments a spring-loaded mechanism could be used. For example, a hydraulic tensioner may be preferred in certain applications as they automatically increase chain tension at higher engine speeds to prevent timing chain slap and noise.

Figure 5:
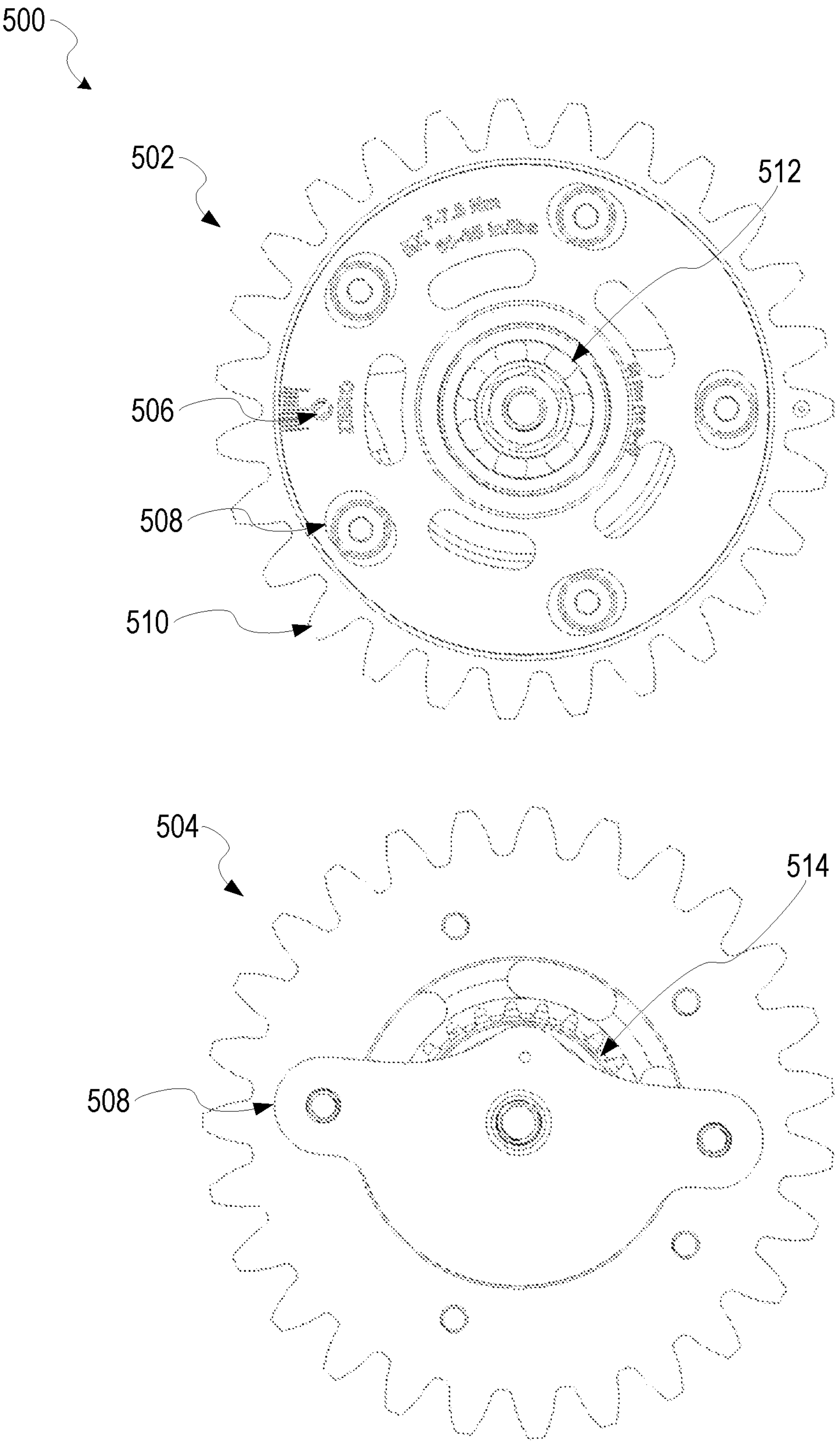
FIG. 5 is a view of an adjustable reverse rotation cam gear, according to certain example embodiments.

FIG. 5 is a diagram 500 depicting a front view 502 and rear view 504 of an adjustable reverse rotation cam gear unit, according to certain example embodiments.

As seen in the diagram 500, the adjustable reverse rotation cam gear unit may comprise an external gear 510, wherein the external gear is adjustably affixed to an internal gear 514 by a series of slotted holes 508 distributed along a mating surface of the internal gear 514. For example, the external gear 510 may be clocked/rotated within the slotted holes 508 in order to adjust a position of the external gear 510 relative to the internal gear 514. In some embodiments, the external gear 510 may be affixed to the internal gear 514 by a series of fixed pins on one or more of the external gear 510 and the internal gear 514.

In some embodiments, the adjustable reverse rotation cam gear unit may further comprise a bearing support 516 to retain a bearing 512. Further details of the adjustable reverse rotation cam gear unit are depicted in FIG. 6 and FIG. 7.

Figure 6:
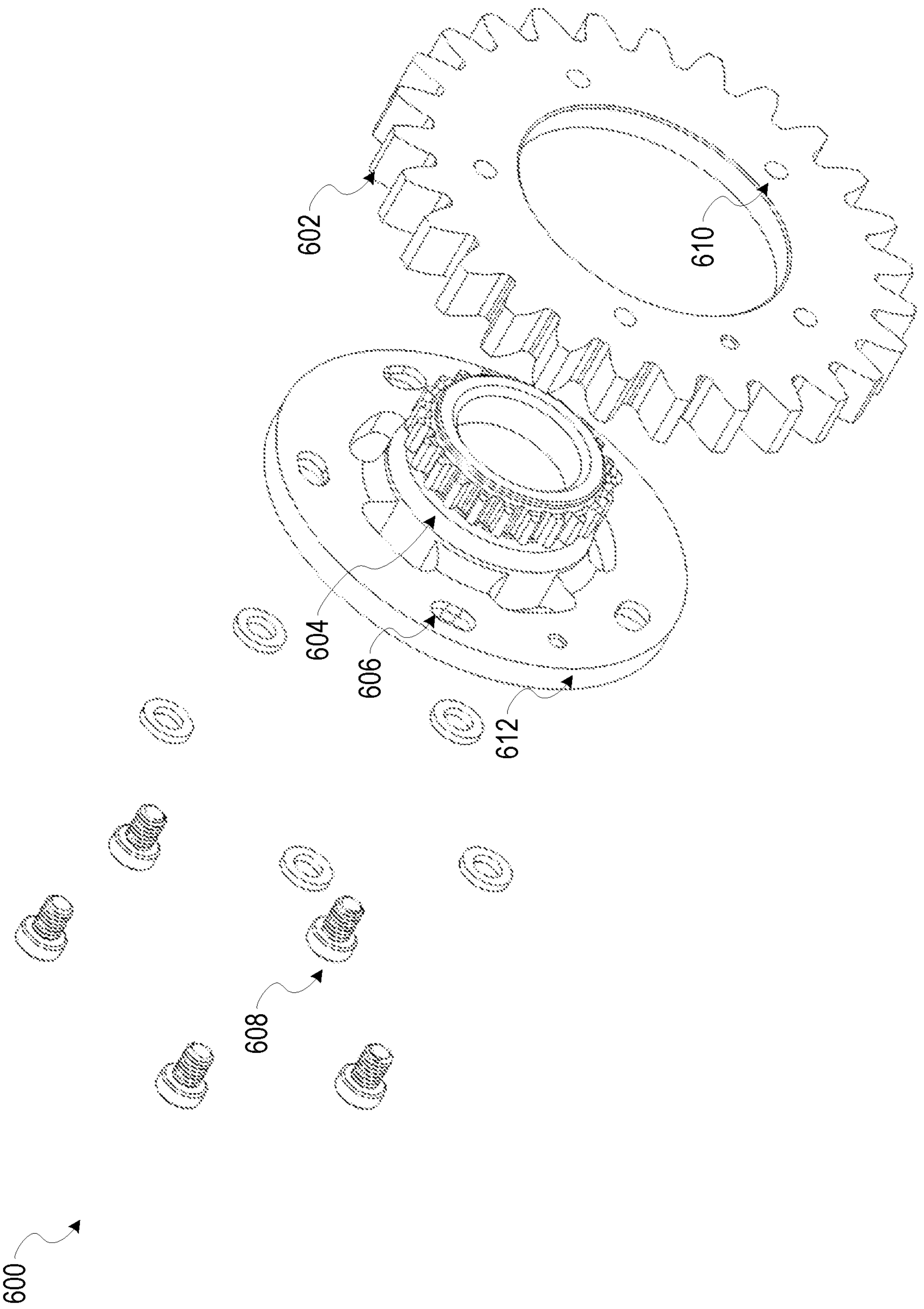
FIG. 6 is an exploded perspective view of an adjustable reverse rotation cam gear, according to certain example embodiments.

FIG. 6 is a diagram 600 depicting an exploded perspective view of an adjustable reverse rotation cam gear, according to certain example embodiments. One or both of the external gear 602 and internal gear 604 can include adjustment features such as slotted holes 606 or slotted pins distributed along their mating surfaces. As seen in the example, the external gear 602 includes threaded bolt holes 610, while the internal gear 604 has a mating surface 612 with slotted holes 606. The adjustable reverse rotation cam gear may comprise an external gear 602 and an internal gear 604, wherein the external gear 602 comprises a set of threaded bolt holes 610, the inner gear comprises a mating surface 612, and wherein the mating surface 612 comprises a plurality of slotted holes 606.

According to certain embodiments, the external gear 602 is mated to the internal gear 604 by bolts 608 inserted through the slotted holes 606 and threaded into the holes 610. The slotted holes 606, or alternatively slotted pins, allow the internal gear 604 to be rotated and clocked to a desired position relative to the external gear 602 before being fastened in place. This adjustment mechanism enables changing the timing of the camshaft drive.

Figure 7:
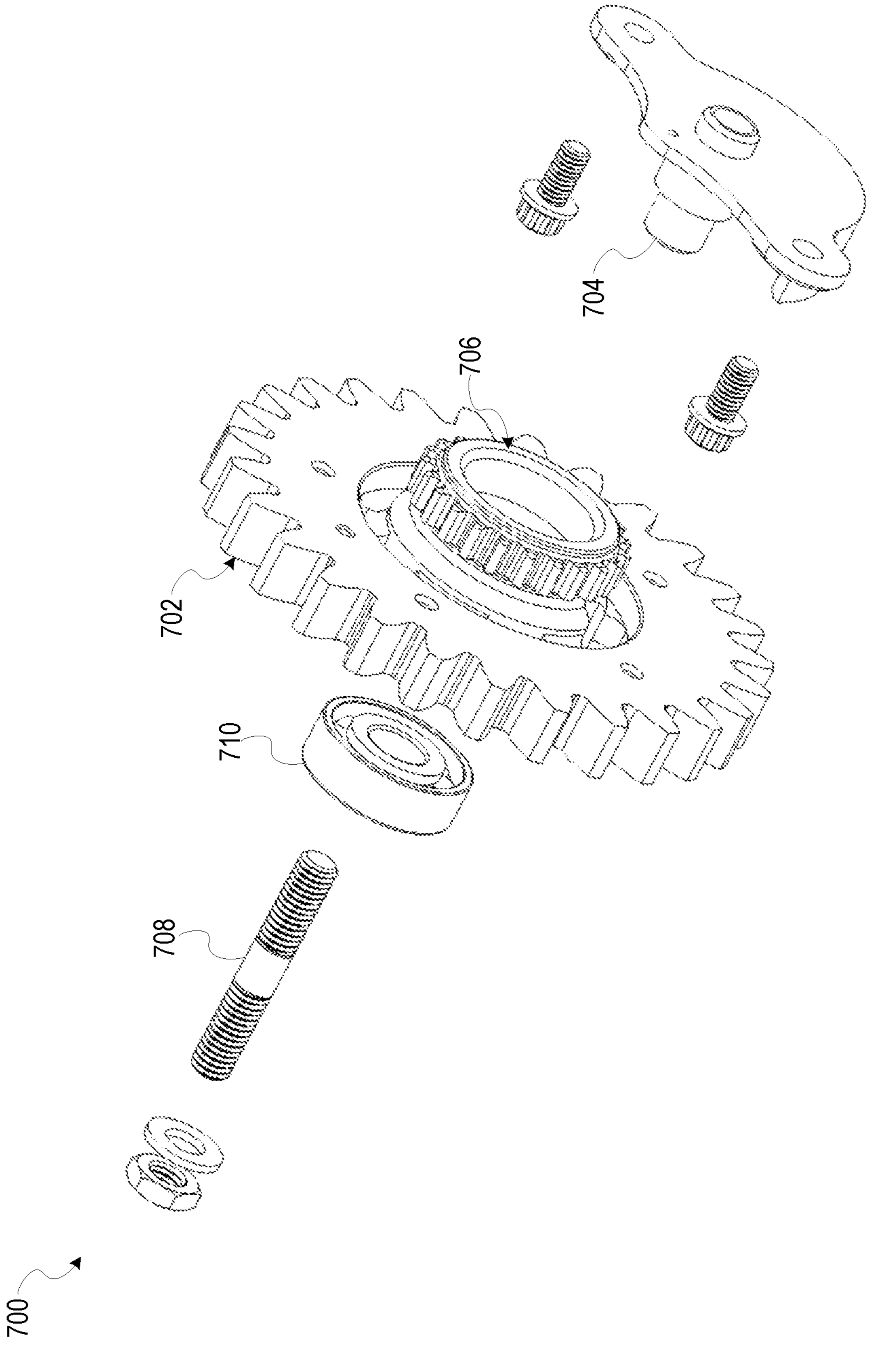
FIG. 7 is a rear exploded perspective view of a combined chain guard and rear-bearing support of an adjustable reverse rotation cam gear, according to certain example embodiments.

FIG. 7 is a diagram 700 depicting a rear exploded perspective view of an adjustable reverse rotation cam gear unit 702 that includes a combined chain guard and rear-bearing support 704, according to certain example embodiments.

According to certain example embodiments discussed herein, the internal gear 706 of the adjustable reverse rotation cam gear unit 702 may drive one or more cam gears, such as the cam gears 310 depicted in FIG. 3 by a chain or belt. The chain guard and bearing support structure 704 retains the chain on the internal gear 706 and prevents the chain from slipping off.

In some embodiments, the adjustable reverse rotation cam gear unit 702 may be mounted upon an engine block by a bolt 708, wherein the bolt 708 may include a stud bolt, or bolts that thread into the engine block. For example, a bearing 710 may be inserted into the adjustable reverse rotation cam gear unit 702, and the bolt 708 may be inserted into a threaded hole of and engine block. In some embodiments, the chain guard and rear-bearing support 704 may be positioned between the adjustable reverse rotation cam gear unit 702 and the engine block. A bearing 710 inserted in the cam gear unit 702 is supported by a protruding neck on the support structure 704. The integrated support structure 704 provides both bearing support and chain retention while being rigidly fixed to the engine block for stability.

Figure 8:
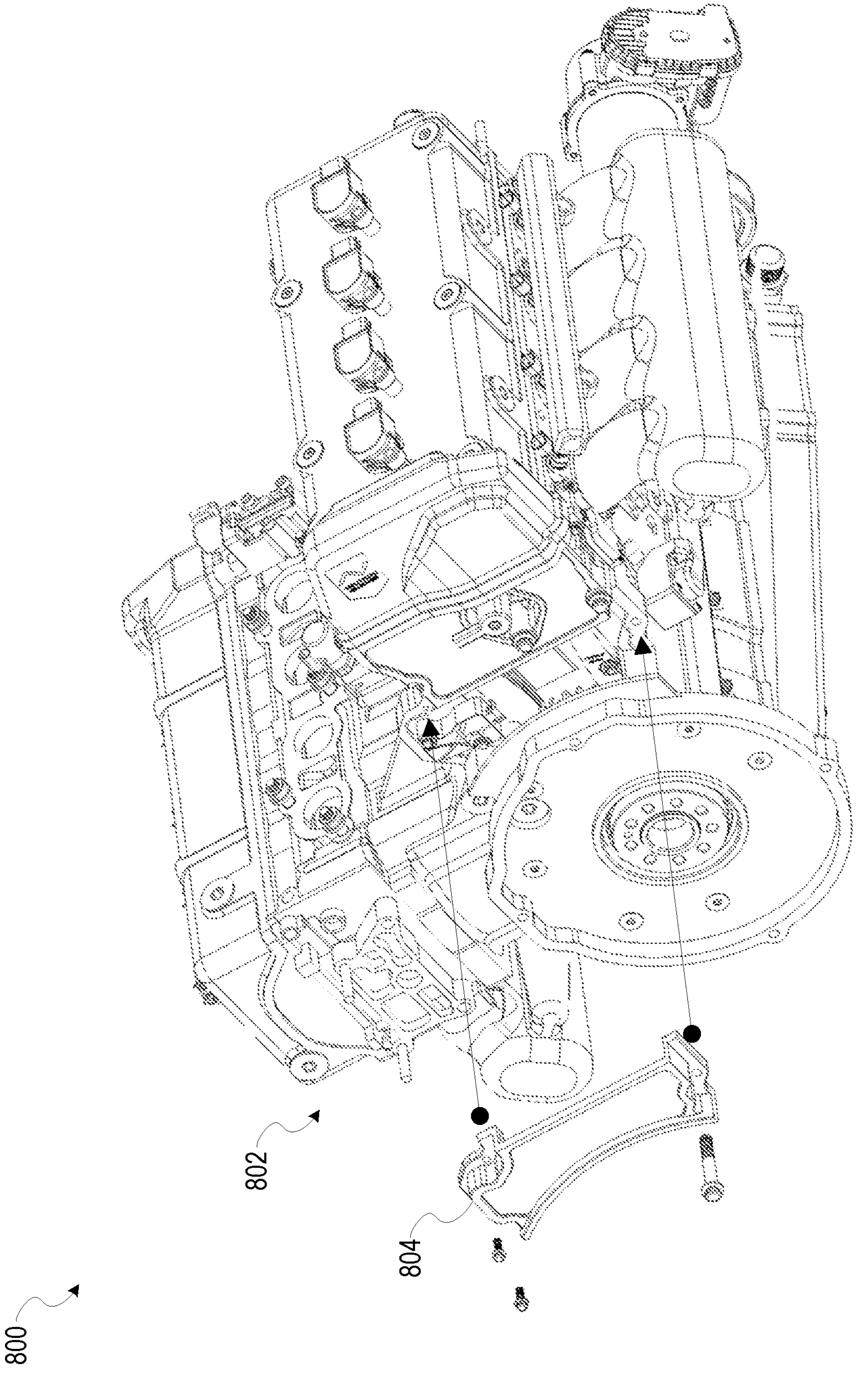
FIG. 8 is a rear exploded perspective view of a piston engine with two-piece rear timing chain cover, according to certain example embodiments.

FIG. 8 is a rear exploded perspective view 800 of a piston engine 802 with two-piece rear timing chain cover 804, according to certain example embodiments.

As seen in rear exploded perspective view 800, a portion of the multi-piece rear timing chain cover 804 may be removed to access components, such as a timing chain, or tensioner, at the rear of the piston engine 802.

Glossary

"CAM GEAR" in this context refers to a gear mechanism which rotates the camshaft(s) of an internal combustion engine.

"CAMSHAFT" in this context refers to a shaft that contains a row of pointed cams, in order to convert rotational motion to reciprocating motion. Camshafts are used in internal combustion engines (to operate the intake and exhaust valves).

"CYLINDER HEAD," or "HEAD" in this context refers to a component which sits above the cylinders and forms the roof of the combustion chamber in an internal combustion engine. The head serves as a housing for engine components such as the intake and exhaust valves.

"TIMING CHAIN" in this context refers to a drive mechanism used to synchronize the rotation of the crankshaft and the camshaft(s). This synchronization ensures that the engine's valves open and close at the correct times in relation to the position of the pistons.

"STUD BOLT" in this context refers to a fastener that comprises a rod that is threaded on both ends.

"BANK ANGLE" in this context refers to the angle between cylinder banks of an internal combustion piston engine.

"FLAT ENGINE" in this context refers to a piston engine where the cylinders are located on either side of a central crankshaft. The most common configuration of flat engines is the boxer engine configuration, in which the pistons of each opposed pair of cylinders move inwards and outwards at the same time.

"V ENGINE" in this context refers to a common configuration for internal combustion engines. It consists of two cylinder banks-usually with the same number of cylinders in each bank-connected to a common crankshaft. These cylinder banks are arranged at an angle to each other, so that the banks form a "V" shape when viewed from the front of the engine.

What is claimed is:

1. A piston engine arranged in a V-configuration, the piston engine comprising:
- a front side and a rear side;
- an engine block extending from the front side to the rear side, the engine block including:
  - a first cylinder bank;
  - a first cylinder head mounted to the first cylinder bank;
  - at least one first overhead camshaft arranged within the first cylinder head, the at least one first overhead camshaft including a first camshaft sprocket disposed at the rear side;
  - a second cylinder bank;
  - a second cylinder head mounted to the second cylinder bank; and
  - at least one second overhead camshaft arranged within the second cylinder head, the at least one second overhead camshaft including a second camshaft sprocket disposed at the front side;
- a crankshaft extending from the front side to the rear side between the first cylinder bank and the second cylinder bank, a front end of the crankshaft including a front gear, and a rear end of the crankshaft including a rear gear;
- a reverse-rotation gear mechanism arranged at the rear side, the reverse-rotation gear mechanism including internal gear and an external gear, the external gear engaged with the rear gear of the crankshaft;
- a first chain engaged with the internal gear and the first camshaft sprocket so as to drive the at least one first overhead camshaft; and
- a second chain engaged with the front gear of the crankshaft and the second camshaft sprocket so as to drive the at least one second overhead camshaft.

2. The piston engine of claim 1, wherein the external gear comprises a 1:1 ratio with the rear gear of the crankshaft, and the internal gear comprises a 2:1 ratio with the rear gear of the crankshaft.

3. The piston engine of claim 1, wherein the external gear includes an adjustment provision configured to just a clocking of the external gear.

4. The piston engine of claim 3, wherein the reverse-rotation gear mechanism is a two-piece gear assembly including a first component defining the internal gear, and a second component defining the external gear, and wherein the adjustment provision includes a set of slotted holes configured to receive a corresponding set of bolts so as to fix the external gear to the internal gear.

5. The piston engine of claim 3, wherein the adjustment provision includes a zeroing pin.

6. The piston engine of claim 1, further comprising a rear bearing support arranged between the reverse-rotation gear mechanism and the engine block so as to support a bearing of the reverse-rotation gear mechanism.

7. The piston engine of claim 6, wherein the rear bearing support includes a chain guard configured to prevent the first chain from dropping.

8. The piston engine of claim 1, wherein the at least one first overhead camshaft comprises a first pair of camshafts, and the at least one second overhead camshaft comprises a second pair of camshafts.

9. The piston engine of claim 1, further comprising a backplate covering the reverse-rotation gear mechanism.

10. The piston engine of claim 9, wherein the backplate is a two-piece backplate assembly including a first piece and a second piece, the second piece covering the reverse-rotation gear mechanism.

* * * * *